Dec. 15, 1936.  C. E. WILSON  2,064,707
DEVICE FOR PACKING PLANTS FOR SHIPMENT AND STORAGE
Filed Sept. 11, 1935
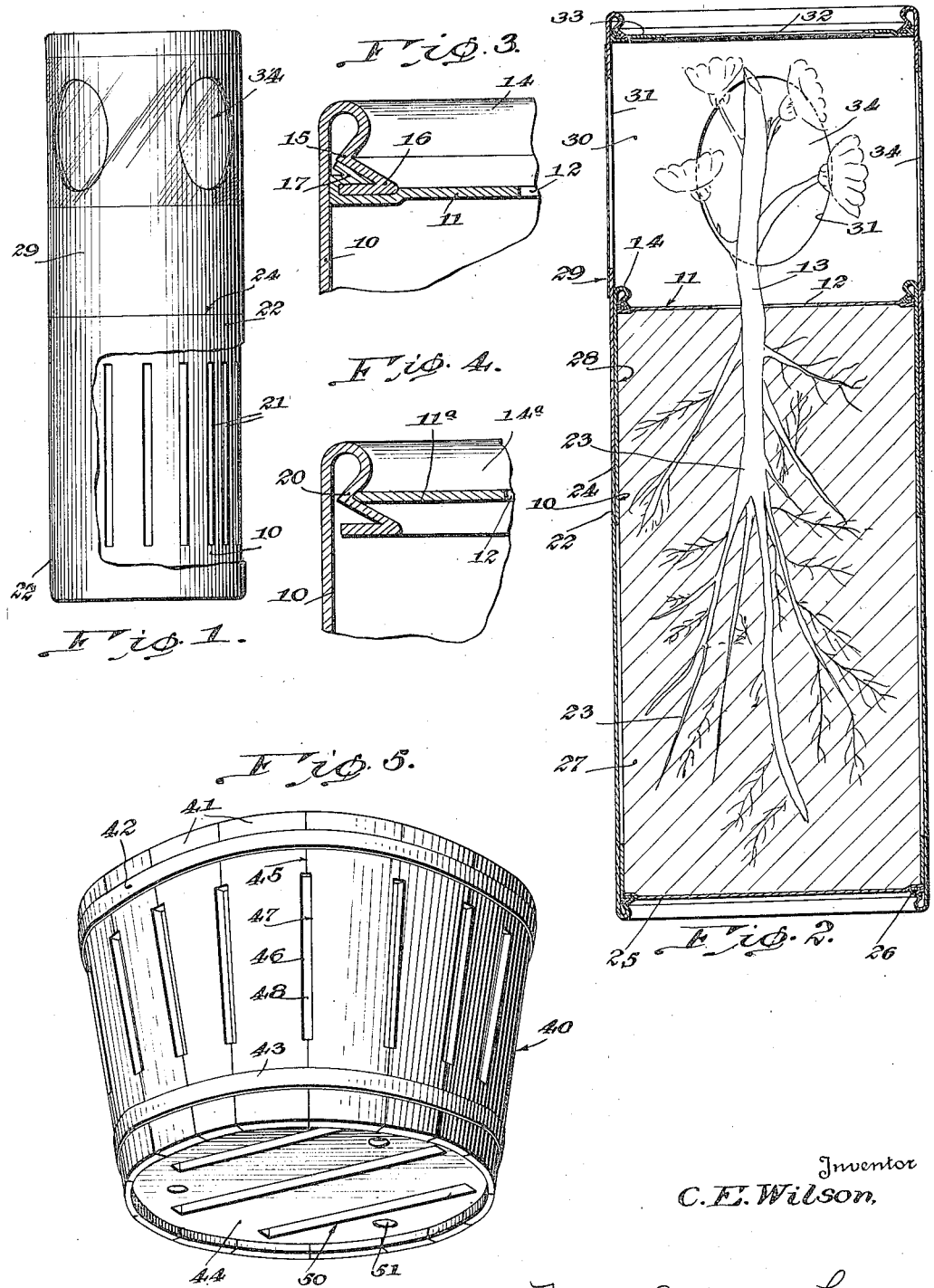
Inventor
C. E. Wilson,
By Munn, Anderson & Leddy
Attorneys Patented Dec. 15, 1936

2,064,707

UNITED STATES PATENT OFFICE 2,064,707

DEVICE FOR PACKING PLANTS FOR SHIPMENT AND STORAGE

Clarence E. Wilson, Manchester, Conn.

Application September 11, 1935, Serial No. 40,145

3 Claims. (Cl. 206—46)

This invention relates to a device for packing plants for shipment and storage.

Various devices have been proposed for packing plants for shipment but no proper means have been provided for properly protecting the foliage or the new roots which may develop during transportation and storage so that when the outer casing is removed the roots are injured. Furthermore, where the plant remains too long in storage the foliage will expand and be crowded in a narrow space whereby the plant will be set back after transplanting.

An object of the invention is the provision of a housing in which a shell is provided for properly replanting the roots in the soil so that when the housing for the shell is removed the roots and replanting material embracing the roots will be maintained intact without injury to roots particularly any growth which may have developed during the storage and transportation.

Another object of the invention is the provision of a container for plants having an adjustable and removable cover for the foliage with the cover being movable outwardly from a housing to take care of additional growth of the foliage during transportation and storage, the roots being contained within the housing which may be placed directly in the ground without disturbing the roots, the housing for the roots being of such material that it will readily disintegrate, the disintegration being furthered by openings formed in the wall of the housing.

A further object of the invention is the provision of a more or less rigid container for plants adapted to be transported and stored for sale, said container including a removable and adjustable top section provided with transparent windows which will aid in sealing the packaged plant against the loss of moisture while protecting the foliage and maintaining a ball of earth intact around the roots.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in elevation of a container constructed in accordance with the principles of my invention, Figure 2 is an enlarged vertical section of the container, Figure 3 is an enlarged fragmentary vertical section of the top of the shell which is enclosed within the container, Figure 4 is an enlarged fragmentary vertical section of a modified form of the top, and Figure 5 is a view in perspective of a tub showing another form of the invention.

Referring more particularly to the drawing, 10 designates a shell having an open bottom. The top is closed by means of a cover disc 11 provided with a centrally disposed passage 12 through which the crown of a plant is adapted to project.

The upper edge of the shell is provided with a variously bent flange generally designated by the numeral 14. This flange is bent outwardly, as shown at 15, and is disposed adjacent the inner wall of the shell 10. The free end of the flange is provided with a V-shaped formation 16 adapted to receive a V-shaped flange 17 formed at the periphery of the top 11, as shown more particularly in Fig. 3. The cover 11 is bent around the free edge of the V-shaped formation 16 so that said cover is removably secured to the shell 10.

In the modified form, as shown in Fig. 4, the upper end of the shell 10 is provided with an inturned flange 14ª having a V-shaped notch 20 adapted to receive the periphery of a top 11ª which is in the form of a flat disc having an opening 12. In each instance the cover is marginally gripped by at least one of the bends of the inturned flange.

Any form of flat disc having a central opening may be employed and any suitable construction may be provided at the upper end of the shell 10 which will removably retain the top 11ª in position, the construction being such that the disc may be readily sprung into position within the upper end of the shell.

The side walls of the shell 10 are provided with slots or perforations 21 so that when a housing 22 is removed from the shell said shell may be placed in the ground whereby the roots 23 of the plant may force their way through the slots or openings and into the soil surrounding the shell.

The housing 22 terminates at 24 at its upper end considerably below the upper end of the shell to provide an extension of the shell beyond the housing for a purpose to be presently explained. The lower end of the housing is provided with a closure 25 which is in the form of a disc and secured in any approved manner, as shown at 26, to the bottom of the housing. The bottom of the housing forms means for maintaining the soil 27 intact within the shell 10 while the side walls of the housing prevent the soil and likewise the growth of roots from projecting beyond the shell. This housing, as has been previously stated, is adapted to be removed when the shell is placed in the soil during transplanting.

A top or closure 29 is provided for the container and has substantially the same cross sectional area as the housing 22 so that it will neatly fit upon the projecting end 28 of the shell. It will be noted that the closure extends considerably above the top 11 to provide a chamber 30 for the foliage of the plant. During transportation and storage the lower end of the closure will rest upon the upper end 24 of the housing 22 although the projecting end 28 of the shell is of sufficient length to raise the closure 29 to compensate for any growth in the foliage of the plant during storage. By the adjustability of the closure on the shell 10 the foliage may expand without distortion to the foliage since the closure may be raised in accordance with the growth of the foliage.

A plurality of openings 31 are formed in the side walls of the closure 29 and an opening 32 is formed in a top 33 for the closure 29. Transparent material 34 is secured either to the inner or outer walls of the closure 29 of the top 33 to permit the transmission of light to the plant. It will thus be seen that the foliage is not only permitted to have the proper growth through light but the foliage will likewise be packed or protected against the loss of moisture.

The crown 13 of the plant is inserted through the opening 12 in the top 11 of the shell 10 and soil packed around the roots 23. The proper amount of fertilizer may be added to the soil in order to provide sufficient food for the roots when the shell is placed in the ground in order to initiate the growth of the roots.

The housing 22 is then forced onto the lower end of the shell completely sealing the shell from the loss of soil through the slots 21 and through the open bottom of the shell.

The closure 29 is then placed upon the extension 28 of the shell and moved downwardly until the lower end thereof engages the shoulder 24 on the housing 22. The package is then ready for shipment and storage.

When the plant has been purchased for transplanting the outer housing 22 is removed and the slotted or perforated shell 28 is placed in the ground and the soil packed around the same.

The closure 29 may be retained upon the shell when the temperature is sufficiently low to injure the foliage. Due to the adjustability of the closure on the shell the closure may be elevated from day to day to compensate for the expansion of the foliage. When the temperature is such that there is no longer any danger the closure may be removed.

The shell 28 remains in the ground and is formed of paper or some suitable composition which will disintegrate so that the roots of the plant may expand in all directions.

In Fig. 5 is disclosed a tub, generally designated by the numeral 40, which may be formed of wooden or composition staves 41. These staves are held in place by means of hoops 42 and 43. A bottom 44 of the usual type is maintained in position when the hoop 43 is forced onto the staves 41.

It will be noted that the side edges 45 of the staves 41 are provided with elongated notches 46 and 47 so that when the staves are in position a slot 48 is provided through which the roots of the plant may pass during growth and when in storage or in transportation.

The bottom 44 is provided with a plurality of openings 50 and 51 which may be of any configuration and these openings permit the roots to expand therethrough.

The tub construction is more particularly adapted for forming a firm ball of earth around the roots of shrubbery or young trees during transportation and storage for protecting the roots and the ball of earth against fracture.

When the plant or shrubbery reaches its destination for transplanting, the hoops 42 and 43 are driven off in any suitable manner so that the staves will fall apart. When this occurs the slotted portions 46 and 47 between the side edges of the staves will move away from any roots which have passed through the passages 48. It will thus be seen that by this means the extended or new growth of roots will not be injured when the staves are removed since the side walls of the slots move away from the roots. If necessary an outside covering of any suitable material, such as paper or burlap, may be applied to the tub.

The top 11 on the shell 10 is disposed below the upper end of said shell so that when water is applied to the roots said top will act as a means for distributing the water through the opening 12. Furthermore, the disc or top 11 is made saucer-like so that it may retain some moisture which will eventually find its way to the roots in the lower end of the shell.

I claim:

1. A container for packaging plants for shipment comprising a shell housing the roots of a plant and provided with openings in the walls thereof, consisting of slots directed longitudinally of the shell so as to provide avenues of egress lying in the course of natural reaching out of said roots, a cover for the upper end of the shell, said cover having an opening, a housing removably mounted on the shell to cover said opening during transportation of the container and terminating short of the upper end of said shell, the resultingly exposed upper shell end providing an extension, a closure having windows and being removably mounted on the shell extension and housing the foliage of the plant.

2. A container for packaging plants for shipment comprising a shell in which the roots of a plant are adapted to be packed with soil, said shell having slots directed longitudinally of the shell so as to provide avenues of egress lying in the course of natural reaching out of said roots, a cover for the upper end of the shell, said cover having an opening through which the crown of the plant projects, a housing removably mounted on the shell, to cover said openings during transportation of the container, said housing having a closed bottom, said shell projecting above the upper end of the housing, a closure for housing the foliage of the plant provided with windows and slidably mounted on the shell projection for unrestricted adjustment on said projection longitudinally of the shell.

3. A container for packaging plants for shipment comprising a shell, a variously bent flange at the upper end of the shell, a cover which is marginally gripped by at least one of the bends of said flange when sprung into position therein, said shell having an open bottom, said cover having an opening through which the crown of a plant is adapted to project, the shell adapted to contain the roots of a plant packed with soil, a housing containing the shell and having a marginal disk-securing means at the lower end of said shell, a disk forming a bottom for the shell, the lower end of the shell holding the rim of the disk against the disk-securing means, a tight closure slidably mounted on the upper end of the shell.

CLARENCE E. WILSON.